UNITED STATES PATENT OFFICE.

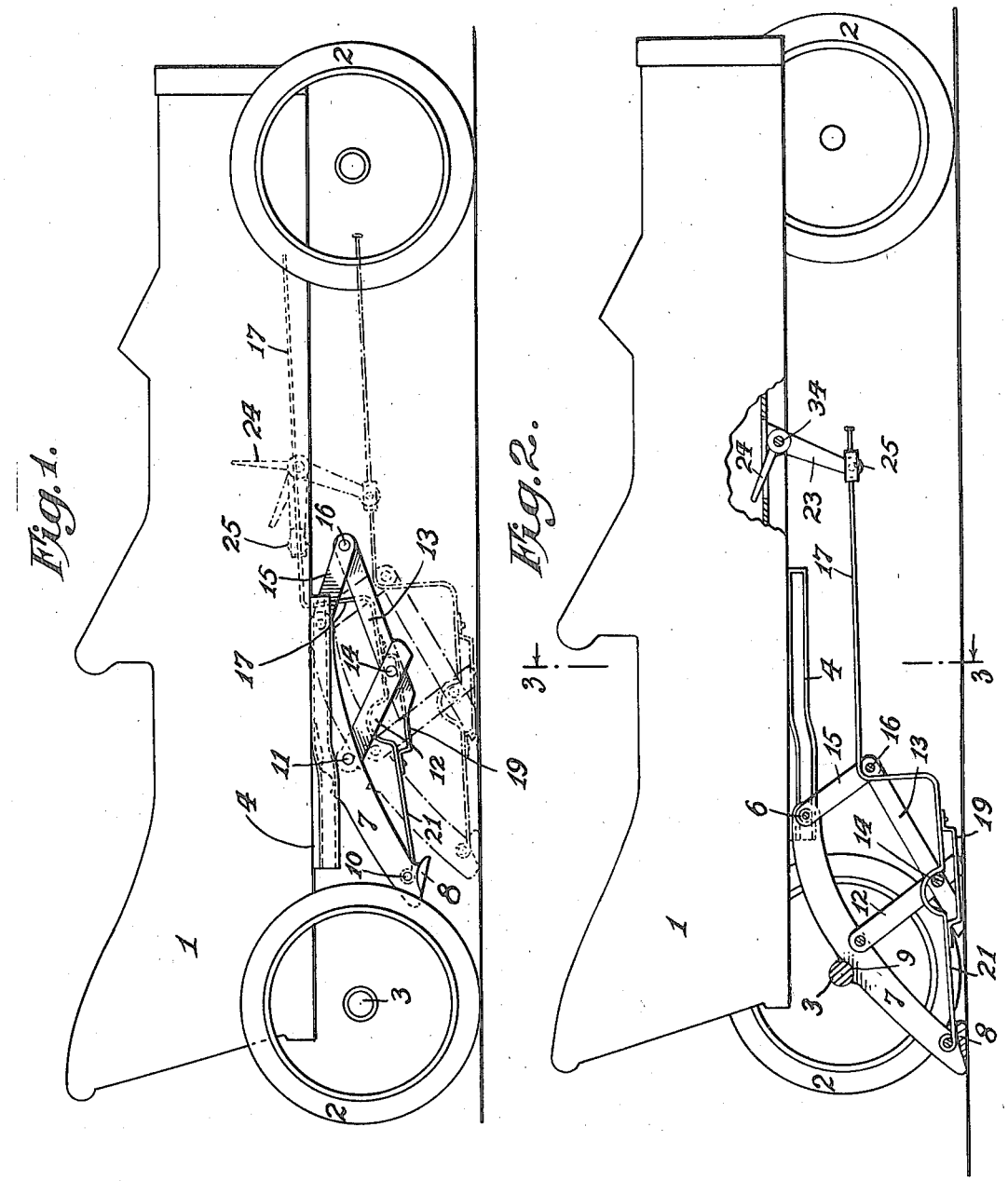

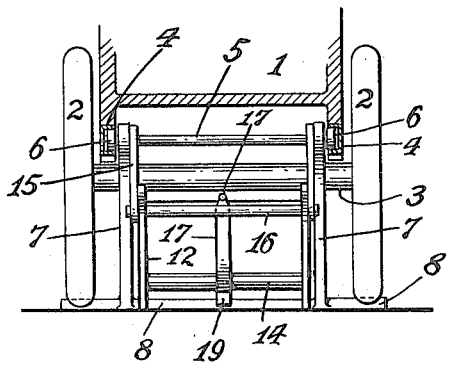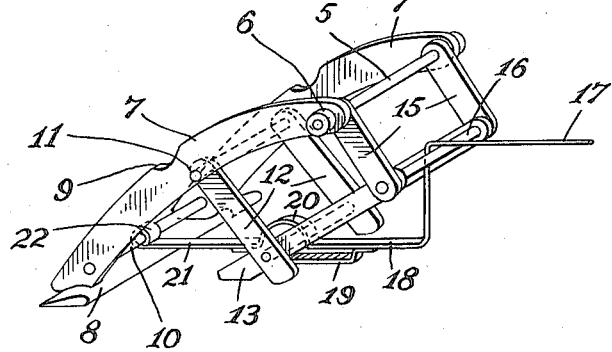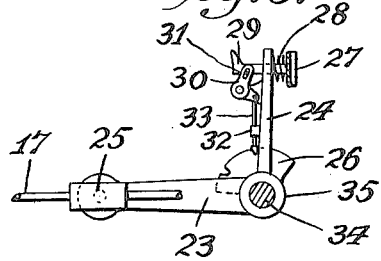

MORRIS KOPPELMAN, OF NEW YORK, N. Y.

EMERGENCY STOP AND JACK FOR AUTOMOBILES.

1,136,145.   Specification of Letters Patent.   Patented Apr. 20, 1915.

Application filed December 21, 1914. Serial No. 878,224.

*To all whom it may concern:*

Be it known that I, MORRIS KOPPELMAN, a citizen of the United States, and a resident of the borough of Brooklyn, in the county of Kings, city and State of New York, have invented new and useful Improvements in Emergency Stops and Jacks for Automobiles, of which the following is a specification.

The invention relates to devices for quickly stopping the travel of automobiles and other vehicles, and is particularly designed to be used in connection with vehicles having pneumatic or other rubber tires, although its uses are not limited to these. Means to accomplish this result have long been sought, and many devices have been produced in an effort to accomplish it, but so far as I am aware none of them has gone into use. The reasons for this are, among others, that the device must not only be quick, certain and effective in its action, but must not give rise to new dangers nor injure the tires or any other part of the vehicle; that it must be quickly and easily applied and without requiring manipulation or adjustment of levers or other devices by the driver; and that it must be relatively inexpensive, easily applied and sightly so as not to necessitate a great amount of trouble or expense or detract from the appearance of the car or the comfort of its occupants. It is with these and other ends in view that the present improvements have been designed, and by employing the device forming the subject-matter of this invention a vehicle may be provided with an emergency stop and jack which may be applied almost instantly, and without any movement on the part of the driver but the simple movement of his foot, will assume its position and act to stop the vehicle without jar or inconvenience or danger and will, when not in operation, be housed in such a manner as to avoid detracting from the appearance of the car, or giving rise to any other objection.

The invention resides in the construction, combination and arrangement of parts hereinafter described and claimed and illustrated in the accompanying drawings.

In the said drawings, Figure 1 is a diagrammatic view of an auto with an emergency stop and jack embodying the improvements connected therewith, the parts being shown in folded inoperative position, and dotted lines indicating the first position assumed by the same when placed in operation. Fig. 2 is a view similar to Fig. 1 with the said emergency stop and jack in final operative position. Fig. 3 is a vertical cross-section on the line 3—3 of Fig. 2, looking in the direction indicated by the arrows in that figure. Fig. 4 is a perspective of the brake and jack in operative or applied position. Fig. 5 is a side view of the pedal for applying the stop and adjacent parts enlarged.

The body of the machine 1 may be of any ordinary desired construction, as may also the wheels 2 and the rear axle 3, it being one of the purposes of the present improvements to so construct the device that it may be applied to automobiles of various sizes and makes.

To the frame or chassis of the machine are secured horizontal tracks 4 constructed of U-shaped metal and adapted to receive the ends of the bar 5, which are provided with rollers 6 in the groove of the tracks, so that the said bar will slide freely along the same. The tracks are bent medially so that the forward part is slightly above the rear part and so that the bar 5 will move downwardly to a certain extent in passing from one end to the other. Secured to this bar at one end by having the same passed therethrough and provided with a shoe 8 extending across from one to the other and secured to their opposite ends are curved flat metal supports 7. These bars are adapted to receive and support the rear axles of the machine, and have recesses 9 which will hold the said rear axles and prevent them from accidentally moving in both directions when engaged therewith.

The bar 10 connects the supports 7 near their lower ends, and a bar 11 connects them intermediate their ends and also supports the upper ends of the supports 12, which extend downwardly therefrom and are connected with the brace bars 13 near their opposite ends by means of the connecting rod or bar 14 extending through both 12 and 13. On the bar 5 are also two connecting pieces 15 supported thereon by having the said bar pass through them near their upper ends and connected with the brace 13 by the rod or bar 16 passing medially therethrough and through the upper ends of the said braces.

It will be seen that the parts above described form an adjustable frame, which may be expanded and retracted or collapsed to place the parts in operation or remove them therefrom. This expansion and contraction of the frame is brought about by the following mechanism: At a point in the car bottom convenient to the driver's seat the bell crank lever composed of the arms 23 and 24 is pivoted by means of the pivot 34. A segment 26 provided with notches engaged by a pawl 33 sliding in a sleeve 32 is fixed to this pivot 34, and the arrangement is such that when the bell crank is in its upper position one of the notches is engaged, while in its lower position the other notch is engaged. The parts are then held in both positions until released therefrom by means of the pedal 27 connected with the pawl 33 through the small bell crank 30, which has a slot 31 receiving a pin on the shank 29 of the pedal. By kicking the pedal 27 with the heel of his foot the driver may instantly release the rod 17 connected with the arm 23 by means of the pivoted sleeve 25, through which it slides and allow it to fall, and carry with it the parts just described, causing them to turn on the pivot 34 to the position shown in Fig. 2, in which position they will be held by means of the pawl 33 entering the lower notch of the segment 26 under the pressure of the spring 28 which holds the pedal 27 normally in its outer position. It will thus be seen that the device is set in operation by a simple backward movement of the driver's foot, and that no other movement on the part of the driver is required. The pedal 27 may have a button or contact device of any desired shape calculated to insure contact between it and the driver's foot, and may also be arranged to move forward instead of backward or in a vertical line.

When the rod 17 falls it permits the adjustable frame carrying the shoe 8 to fall or expand, until the shoe 8 and the extremities of the parts 12 and 13 come in contact with the ground. The device may be so constructed and arranged that pressure by the foot of the driver will accelerate this movement or may be provided with springs for that purpose. If properly constructed and arranged, however, as shown the action will be certain and almost instantaneous. It will be understood that the lower extremities of the parts 12 and 13 may also be provided with shoes, or a common shoe of any suitable form.

When the frame expands by gravity and the shoe 8 comes in contact with the ground the entire frame will be caused to slide backwardly on the body of the car. This movement is permitted by the sleeve 25 through which the rod 17 slides and by the tracks 4 in which the wheels 6 at the ends of the bar 5 from which the frame is hung travel, and on account of the downward trend of the track 4 the upper end of the support 7 is lowered before the axle 3 engages its recess 9.

The frame will move backward a short distance before causing the rod 17 to move, and this limited movement brings the bar 16 into the angle at the downward turn of the said rod and also brings the bar 14 into the bend 20 on the lower horizontal section of the rod. The effect of this engagement is to hold the frame in its expanded position until the rod is again raised, the portion of the rod 21 acting as a strap to confine the parts to which it is connected by means of the contact between 20 and 14 and the collar 22 at its outer extremity, which is turned around the rod 10. The guard 19 secured to the rod opposite the recess 20 prevents accidental disengagement of the rod and the bar 14.

As soon as the shoe 8 has moved to a position beneath the rear wheel 2 the wheel passes over it, and raises the rear axle slightly, so that it will lodge in the recess 19 and thus hold the wheels off the ground. The machine will then travel for a very short distance, depending upon its speed, with the weight of the rear end of the body on the shoe 8 and the extremity of the part 12 until it is brought to a stand still. This will occur before the machine has traveled any considerable distance once the weight of the machine is placed on the shoe, and the result is attained whether the clutch is released or not, for the reason that the driving wheels of the machine are raised from the ground. This arrangement not only stops the machine very quickly and on account of its construction and operation prevents it from upsetting or losing its direction, but saves the tire shoes which are liable to be worn or burnt through when the emergency brake is applied.

When it is desired to use the device here described merely as a jack it may be applied while the car is moving slightly in the garage or elsewhere, and when it is desired to restore the parts to their normal position out of operation it is only necessary to press the pedal 27 and rock the bell crank 23, 24 so as to raise the rod 17 and permit the parts 7 and 12 to spread, thus bringing the wheel down to the ground. By backing the car slowly now the parts are restored to their normal position between the front and rear wheels. The frame and shoe are then raised by the upward movement of the rod 17 which, pressing against the bar 14 at 19 causes the frame composed of the parts 7, 12, 13 and 15 to collapse and withdraw the lower extremities of the parts from the ground. By arranging the parts so as to bring about such a result the frame may be folded in this manner so as to be entirely out of sight beneath the car. If found desirable a stop may be placed on the rod 17 forward of the pivoted sleeve 25 to prevent it from being accidentally withdrawn from the sleeve, and the part 20 may be so formed as to hold the bar 14 in the position shown in Fig. 2, until a considerable forward pressure is exerted on the rod 17.

It will be understood that various modifications in the details of construction may be made without departing from the spirit or scope of the invention; for instance that the track 4 may be made straight or of other form and that the frame may be mounted on two or more pairs of rollers instead of one; and that the parts may also be so modified as to adapt them for machines of different patterns.

What I claim is:

1. In a device of the character described, the combination of a shoe, a frame on which the said shoe is mounted, means for moving the said frame so as to bring the said shoe into contact with the ground adjacent to the wheel of the vehicle, and means for permitting the said frame to move relatively to the vehicle so as to permit the wheel to pass over the shoe, and means brought into operation on the passage of the wheel over the shoe for holding the wheel suspended above the ground.

2. In a device of the character described, the combination of a shoe, a frame on which the said shoe is mounted, means for moving the said frame so as to bring the said shoe into contact with the ground adjacent to the wheel of the vehicle, and means for permitting the said frame to move relatively to the vehicle so as to permit the wheel to pass over the shoe, and means brought into operation on the passage of the wheel over the shoe and forming a part of said frame, for holding the wheel against return to the ground after it has passed over the said shoe.

3. The combination with a vehicle comprising a body and wheels of a stop and jack, consisting of a shoe adapted to be moved from an elevated position to a position on the ground in front of a wheel, a support by which said shoe is suspended, said support being slidably connected with the body of the vehicle, means for moving the said support to move the shoe into contact with the ground, means for moving it to raise the said shoe from the ground and means for locking the same in both positions, and means for causing the wheel to be held in a position elevated from the ground on the said support.

4. In combination with a vehicle body supported on front and rear axles traveling on wheels, a shoe, a flexible connection between the said shoe and the body of the vehicle, whereby the same may be moved to and from the ground forward of one of the wheels, a connection between the said flexible shoe connection and the body permitting relative longitudinal movement of the said parts, whereby the wheel is permitted to pass over the shoe, and be raised above the ground thereby, and means for automatically supporting the said wheel above the ground and out of contact with the shoe after it has passed over the same.

5. In combination with a vehicle body supported on front and rear axles provided with wheels, a folding frame supported beneath the body of the vehicle so as to have bodily longitudinal movement, said frame also having parts which move vertically when the same folds and unfolds to remove them from contact with the ground and place them in contact therewith.

6. In combination with a vehicle body supported on front and rear axles provided with wheels, a folding frame supported beneath the body of the vehicle so as to have bodily longitudinal movement, said frame also having parts which move vertically when the same folds and unfolds to remove them from contact with the ground and place them in contact therewith, and means for folding and unfolding the frame and locking the same in both positions, said means operated from the interior of the vehicle body.

Witness my hand this 4th day of December, 1914, at the city of New York, in the county and State of New York.

MORRIS KOPPELMAN.

Witnesses:
MARY H. LEWIS,
HELEN V. FITZPATRICK.